United States Patent [19]

Richards et al.

[11] Patent Number: 5,701,163
[45] Date of Patent: Dec. 23, 1997

[54] VIDEO PROCESSING METHOD AND APPARATUS

[75] Inventors: John William Richards, Stockbridge; Martin Rex Dorricott, Basingstoke, both of United Kingdom

[73] Assignees: Sony Corporation, Tokyo, Japan; Sony United Kingdom Limited, Weybridge, England

[21] Appl. No.: 573,992

[22] Filed: Dec. 18, 1995

[30] Foreign Application Priority Data

Jan. 18, 1995 [GB] United Kingdom ............... 9501072

[51] Int. Cl.$^6$ ................................... H04N 5/262
[52] U.S. Cl. .................. 348/578; 348/579; 348/598; 348/618; 348/619; 382/107; 382/262; 382/264
[58] Field of Search ........................ 348/578, 579, 348/598, 618, 619, 620, 626, 597; 382/107, 262, 264

[56] References Cited

U.S. PATENT DOCUMENTS

| 4,800,511 | 1/1989 | Tanaka ........................ 382/262 |
| 5,198,902 | 3/1993 | Richards et al. ........... 348/598 |
| 5,253,065 | 10/1993 | Richards et al. ........... 348/579 |
| 5,561,724 | 10/1996 | Kido et al. .................. 382/264 |
| 5,600,731 | 2/1997 | Sezan et al. ................ 382/107 |

FOREIGN PATENT DOCUMENTS 2 247 587  3/1992  United Kingdom .
2 255 466  11/1992  United Kingdom .

Primary Examiner—Tommy P. Chin
Assistant Examiner—Frank Snow
Attorney, Agent, or Firm—William S. Frommer; Alvin Sinderbrand

[57] ABSTRACT

A video processing method and apparatus for processing video frames comprising animated images so as to blur movement of the animated images between successive frames, the method or apparatus comparing a first input frame with the following input frame; identifying moving areas in the first input frame by the comparison; calculating the velocity of the movement of the moving areas between the first and following input frame; summing, only for each input pixel site within the identified moving areas of the input frame, the pixel value of each input pixel site and adjacent pixel values determined according to the calculated velocities and a predetermined aperture type for the input frame; and providing an output frame from at least the summed pixel values and pixel values of areas of the input frame other than the moving area, the adjacent pixel values either being the pixel values of pixel sites in the input frame which are spatially adjacent in the direction of the velocity or predicted temporally adjacent pixel values for each input pixel site for times intermediate the predetermined aperture time.

19 Claims, 3 Drawing Sheets

(a)
(c) UNCOVERED
(b)
v (a) UNIFORM LIGHT TRANSMISSION
(b) NON-UNIFORM LIGHT TRANSMISSION

VIDEO PROCESSING METHOD AND APPARATUS

BACKGROUND OF THE INVENTION

1. Field of the Invention

The present invention relates to a video processing method and apparatus and more particularly to a video processing method and apparatus by which the quality and realism of animated film sequences may be improved.

2. Description of the Related Art

Animated sequences have previously suffered from the problem that they often contain unnaturally sharp and jerky movement. This is because, where an animated object moves in the film sequence, there is no movement of the object during the finite shutter period of the camera. Thus, unlike live action filming, no motion blurring of the image is produced.

One attempt to overcome this problem involves moving a model during the aperture period of the camera by using, for instance, small hydraulic pistons, etc. However, this method is not only elaborate and costly, but also very labour intensive due to the need to plot in detail all trajectories of the movement beforehand.

An electronic process based on motion compensated interpolation has also been contemplated as a solution to this problem. This technique involves 1) estimating movement in a frame, for example from current, previous and next frame data, and identifying the moving areas and their direction of motion, 2) calculating the trajectory of motion consistent with the desired aperture time, eg. 1/48th of a second, 3) sub-dividing the trajectory into a number of fine steps, for instance equivalent to one pixel spacing, such that, for example, if the motion was 10 pixels up and 10 pixels to the right, the trajectory could be sub-divided into 14 steps of one pixel length in the diagonal direction, and 4) using a frame store to accumulate the value of each pixel in the frame with the moving object offset by each step in the sub-divided trajectory, eg. 14 steps in the above example, all data values being totalled and then divided by the number of steps to average the value. The accumulation requires both previous and next frame picture data to be available, because objects revealed from behind the moving object will need to be "selected" for accumulation in the store.

This technique suffers from the problem that steps 3 and 4 are extremely computationally intensive, especially for large ranges of motion. Furthermore, areas which are covered or uncovered by the motion in the image are given pixel values taken from the moving objects in such a manner that the correct blurring in these areas is not achieved.

OBJECT AND SUMMARY OF THE INVENTION

It is an object of the present invention to provide a video processing method and apparatus by which unnaturally sharp and jerky movement in animated sequences may be reduced.

According to the present invention there is provided a method for processing video frames comprising animated images so as to blur movement of the animated images between successive frames, the method comprising the steps of:

comparing a first input frame with the following input frame;

identifying moving areas in the first input frame by means of the comparison;

calculating the velocity of the movement of the moving areas between the first and following input frame;

summing, only for each input pixel site within the identified moving areas of the input frame, the pixel value of said each input pixel site and adjacent pixel values determined according to the calculated velocities and a predetermined aperture time for the input frame; and providing an output frame from at least the summed pixel values and pixel values of areas of the input frame other than said moving areas.

The present invention also provides an apparatus for processing video frames comprising animated images so as to blur movement of the animated images between successive frames, the apparatus comprising the steps of:

means for comparing a first input frame with the following input frame;

means for identifying moving areas in the first input frame by means of the comparison;

means for calculating the velocity of the movement of the moving areas between the first and following input frame;

means for summing, only for each input pixel site within the identified moving areas of the input frame, the pixel value of said each input pixel site and adjacent pixel values determined according to the calculated velocities and a predetermined aperture time for the input frame; and means for providing an output frame from at least the summed pixel values and pixel values of areas of the input frame other than said moving areas.

The adjacent pixel values may be the pixel values of pixel sites in the input frame which are spatially adjacent in the direction of the velocity.

Alternatively, the adjacent pixel values may be predicted temporally adjacent pixel values for said each input pixel site for times intermediate said predetermined aperture time.

Hence, the present invention may provide a technique which effectively produces the same results as those described above, but in a more computationally efficient manner. The invention requires less computation as it builds up the composite by projections of only the moving parts of the picture. It also allows the number of projections of a moving object to be generally proportional to the magnitude of the object vector. Static uncovered and covered regions may then be composited as separate processes.

Hence, the present invention offers the advantages of reducing the computational requirement and providing a fixed algorithm to resolve uncovered and covered regions.

Additionally the present invention may offer considerable savings in implementation hardware and software and provide a deterministic processing requirement.

DETAILED DESCRIPTION OF THE PREFERRED EMBODIMENTS

The present invention will be more clearly understood from the following description, given by way of example only, with reference to the accompanying drawings.

Live action may be recorded using a film camera having a finite shutter speed or a video camera having an "effective" shutter speed of one video field period. The shutter speed may typically be 1/48th second for a 180° shutter, i.e. a shutter which is "open" for half of its cycle. The result of this finite shutter speed is that any motion in the field of view will be integrated over the period for which the shutter is open so as to give a slightly blurred image on the film or video.

The blurring of the image actually gives a natural characteristic to the movement and effectively temporally pre-filters the picture prior to sampling, thereby reducing alias in the sampling processes.

As discussed above, in single frame animation, there is no such integration of the picture, because, even though the cameras have a finite shutter speed, the model or image to be animated does not move during the period for which the shutter is open and therefore there is no motion blurring of the image.

To process an animated image using motion compensated interpolation, the shutter time may be time sliced into N divisions. By means of these intermediate steps, N complete projected images are produced, the choice of N being dependent on the maximum vector in the scene and the coarseness which is acceptable for the particular application. The N complete projected images are then composited to produce the required output image.

The present invention is directed to processing only moving parts of the picture. According to a first embodiment of the invention, the first process is to determine the vector field of the image.

This may be achieved by sub-dividing an image frame into a plurality of blocks and then finding, using a sum of differences, the correlation of each of these blocks throughout a respective larger block in the next frame. Thus, for each larger block, data forming a correlation surface may be produced and from this data, vectors may be produced for each of the original smaller blocks. By known techniques, a vector field of improved resolution, eg. having one vector per pixel, may be produced and this may be scaled in accordance with projected images intermediate the input pair of image frames.

Figure 1:
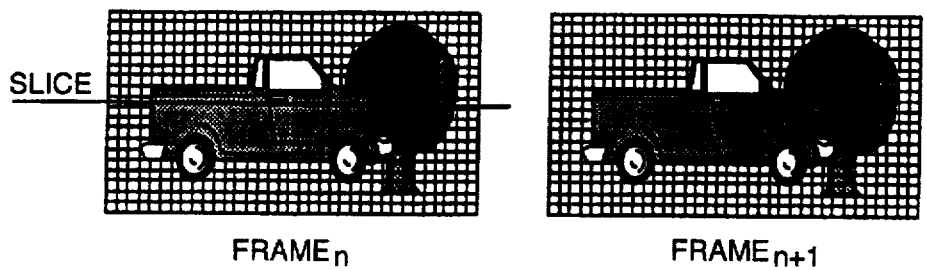
FIG. 1 illustrates two consecutive unprocessed animated images.

FIG. 1 shows a slice or row of pixels taken from two consecutive frames. For convenience, the chosen row is in the direction of movement and, in this illustration, the van is moving 16 pixels per shutter cycle, i.e. 4 pixels during a shutter open period having a shutter angle of 90°.

Next, an uncover/cover status is generated for each of the image pixels in accordance with the vector field information. This information allows pixels of the moving areas to be identified and may also be used to provide estimated positions of moving objects at intermediate times.

Figure 2:
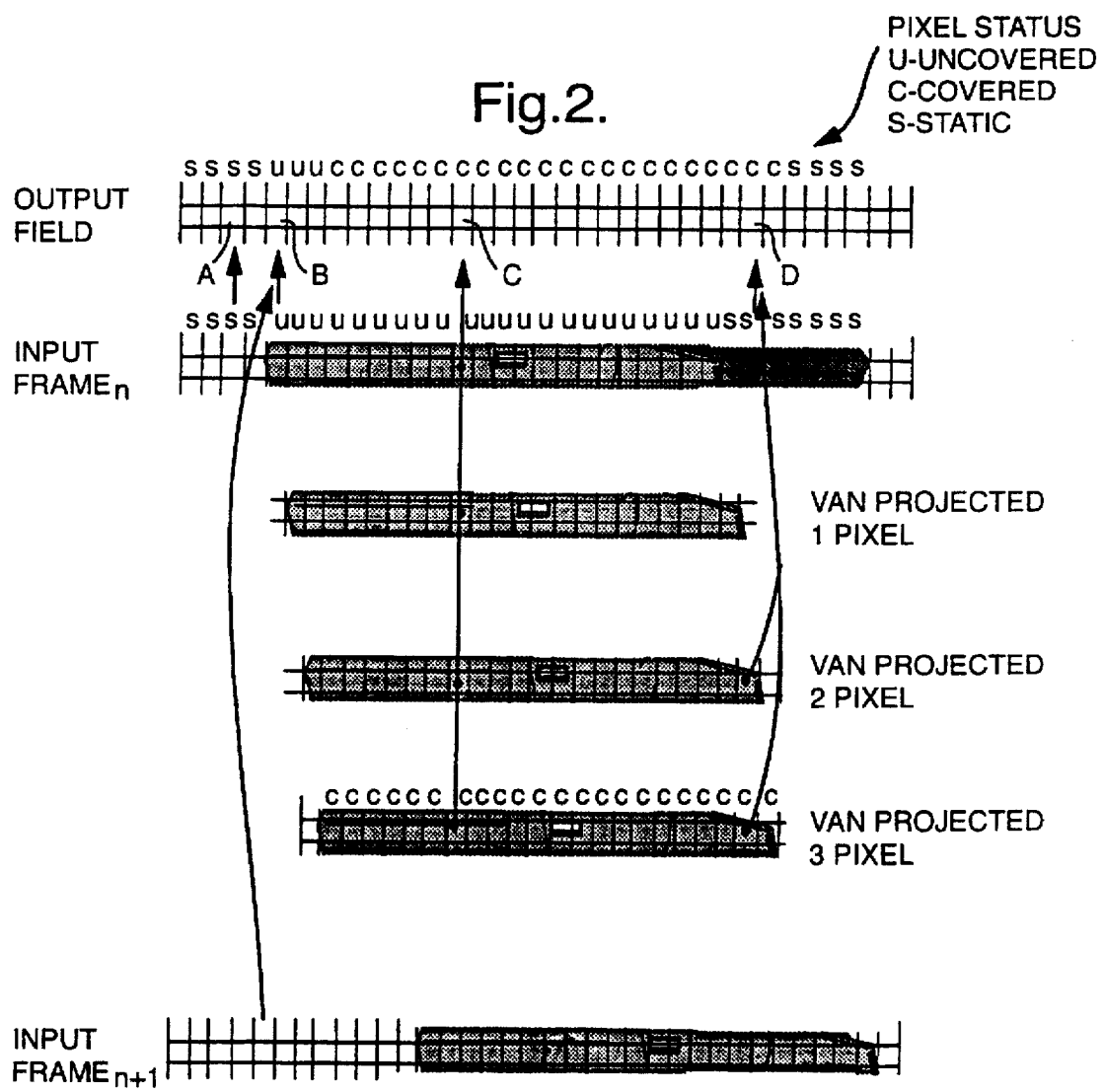
FIG. 2 illustrates processing of the images illustrated in FIG. 1.

Referring to FIG. 2, flags are first set for all of the pixels of the input frame, i.e. frame n in FIG. 2. In particular, all the pixel sites where a moving object, i.e. the lorry, is located in the input frame are initially set with flags u which indicate that these pixels will be uncovered with motion of the image. All other pixels in the image are set with flags s which indicate that the pixels are static.

Next, flags c are determined for the pixel sites of moving objects located at their projected position at the end of the open shutter period. The final pixel flag status for the image is then produced by replacing any of the uncovered flags u or static flags s in the input frame with the covered flags c where they occur.

The output picture may then be generated by adding together the pixel values of the moving objects at each of their projected positions between and including their start position and their estimated position at the end of the shutter period. However, to do this, only the pixels having uncovered flags u or covered flags c need be considered and pixels having static flags s need not be processed at all.

Figure 4:
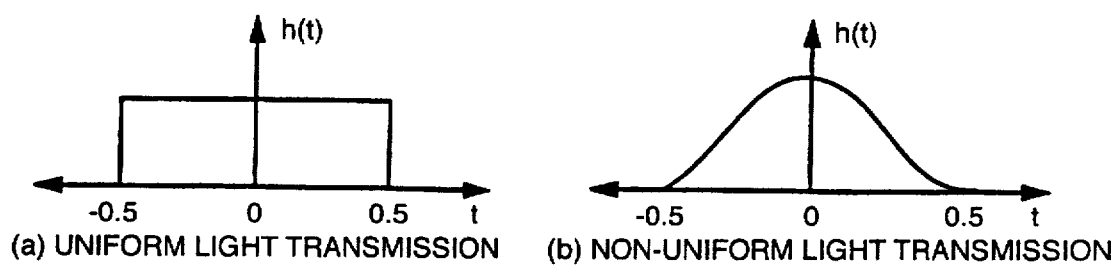
FIG. 4 illustrates a shutter transmission characteristics which may be used in conjunction with the present invention.

The projected objects are added together by summing, for each pixel site, each value of that pixel site for each projected position of the moving objects. However, the respective values of the pixel sites at the respective stages need to be weighted. The simplest method is to weight each value by 1/d, where d is the distance in pixels which the object moves and therefore the number of composited images in the shutter open time. This weighting represents a uniform light transmission throughout the shutter open time as illustrated in FIG. 4(a). However, as illustrated in FIG. 4(b), the light transmission during the shutter open time may have some other characteristic and hence the weighting may alter accordingly. In the case illustrated in FIG. 4(b), projected objects at the central portion of their motion would be weighted more heavily than those at the start or end of the shutter open time.

An array is provided to accumulate for each pixel site, a composite fraction f representing the fraction of the final image to be formed from the moving object pixel values. Thus, the array stores, for each pixel site, the accumulated total of the above-mentioned weightings applied to values of that pixel site.

Thus, for the particular pixel sites marked A, B, C and D in FIG. 2, the uncover/cover status, the composite value of van pixels to be used in calculating the output values and the accumulated composite fraction f are as follows:

| | Uncover/cover status | Composite Value | Accumulated Composite fraction (f) |
| --- | --- | --- | --- |
| A | S | 0 | 0 |
| B | U | 1 Van pixel × ¼ | ¼ |
| C | C | 4 Van pixels × ¼ | 1 |
| D | C | 2 Van pixels × ¼ | ½ |

In the above, to calculate the composite value of the van pixels, the appropriate van pixel values are summed. Thus, in the case of pixel site C, the 4 different pixel values occurring at that site in the 4 images (input+3 projected) are multiplied by the weighting factor ¼ and then summed. In this example, of course, since the weighting factor is constant, the 4 values can be summed and then weighted together.

The actual output pixel values are now calculated.

For pixel sites having static flags S, the pixel values for the output frame are merely equal to the input pixel values.

For the pixel sites having uncovered flags U, the output pixel value equals the total of the composite value calculated for the moving object plus an appropriate fraction of the pixel value of the background static image at the next field n +1.

For the pixel sites having covered flags C, the output pixel value is calculated as a total of the composite pixel value calculated for the moving object plus the appropriate fraction of the pixel value of the static background image in the input field n.

In summary, the values are calculated as follows:
Static : Output total=100% input pixel (field n)
Uncovered: Output total=composite value of moving object pixel+(1−f)×pixel value at field n+1

Covered: Output total=composite value of moving object pixel+(1−f)×pixel value in field n Thus, for the example pixel sites A, B, C and D in FIG. 2 the final composite values are as follows:

| | Uncover/cover status | Final Composite Value | Final Composite fraction |
|---|---|---|---|
| A | S | field n pixel | 1 |
| B | U | Van pixel × ¼ + field pixel n + 1 × ¾ | 1 |
| C | C | Sum of 4 Van pixels × ¼ | 1 |
| D | C | Sum of 2 Van pixels × ¼ + field pixel n × ½ | 1 |

Finally, if two moving objects project into the same pixel site, the final composite fraction will be greater than 1. To rectify this, the entire output image should then be divided by the final composite fraction value.

The description has been given with reference to pixel by pixel calculations. However, to achieve greater smoothness, it may be more appropriate to use small 2-dimensional interpolators at each stage, thereby allowing processing of projected images effectively falling between pixels and giving rise to sub pixel accuracy. This process might also be used where the vector field indicates a movement of 5 pixels to the projected image at the end of shutter open time, but only 3 projected images are used.

According to a second embodiment of the present invention, it is possible to use a more simple technique to approximate the motion blur associated with moving objects, rather than recreating it accurately.

Figure 3:
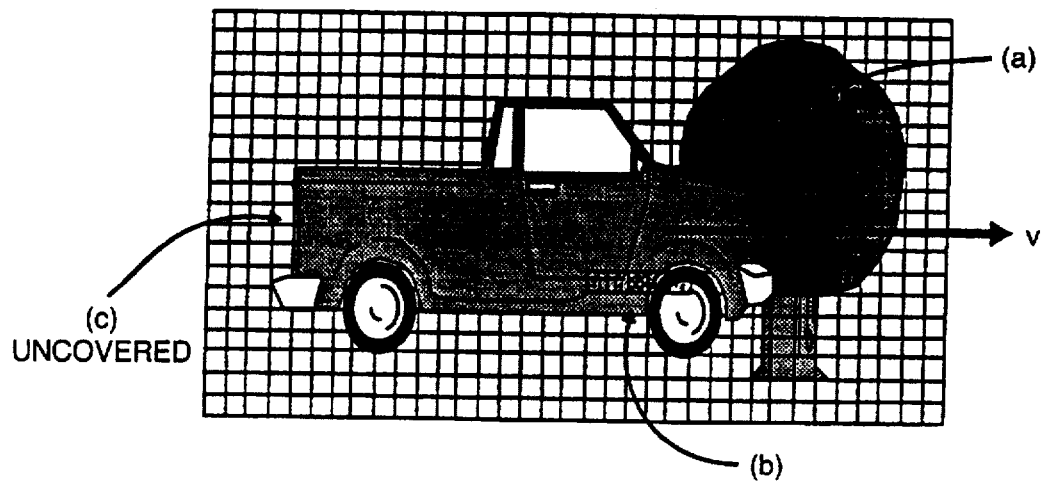
FIG. 3 illustrates an animated image.

With reference to FIG. 3, it will be appreciated in view of the description given above that, in static areas such as region A, there will be no motion blur, whilst, in moving areas such as region B, the image will be blurred according to the object velocity and the shutter speed.

The following equation describes the integration offered by a shuttered camera with a finite shutter opening time:

$$I_{blur}(x, y) = \left( \sum_{m=-\frac{vd}{2}}^{\frac{vd}{2}} w\left(\frac{m}{vd}\right) \times I_{sharp}(x+m, y) \right) / (vd)$$

where: (x,y)=pixel coordinates, lsharp=input luminance field, lblur=processed output field, v=velocity of object measured in number of pixels moved per complete shutter cycle, d=shutter opening as a fraction of shutter speed, w=shutter transmission characteristics (eg. FIG. 2).

This equation could be considered to represent an FIR filter whose characteristics depend on pixel velocity and shutter characteristics. Thus, the motion blur for regions A and B can be created by providing a single pass of an adaptive filter having the appropriate characteristics. For static areas, the velocity V is zero and, hence, the FIR uses a single tap of unity. In other words, the equation above is replaced by lblur (x,y)=lsharp (x,y).

For areas which are uncovered or covered by the movement of the moving object, for instance as marked as C in FIG. 3, a further approximation must be made. In these areas, motion is indicated as zero. However, in reality, for part of the time that the shutter is open, the area would have been covered by the moving object. The approximation required to give motion blur is proportional to the speed of the object and the distance that the uncovered pixel is away from the object.

Figure 5:
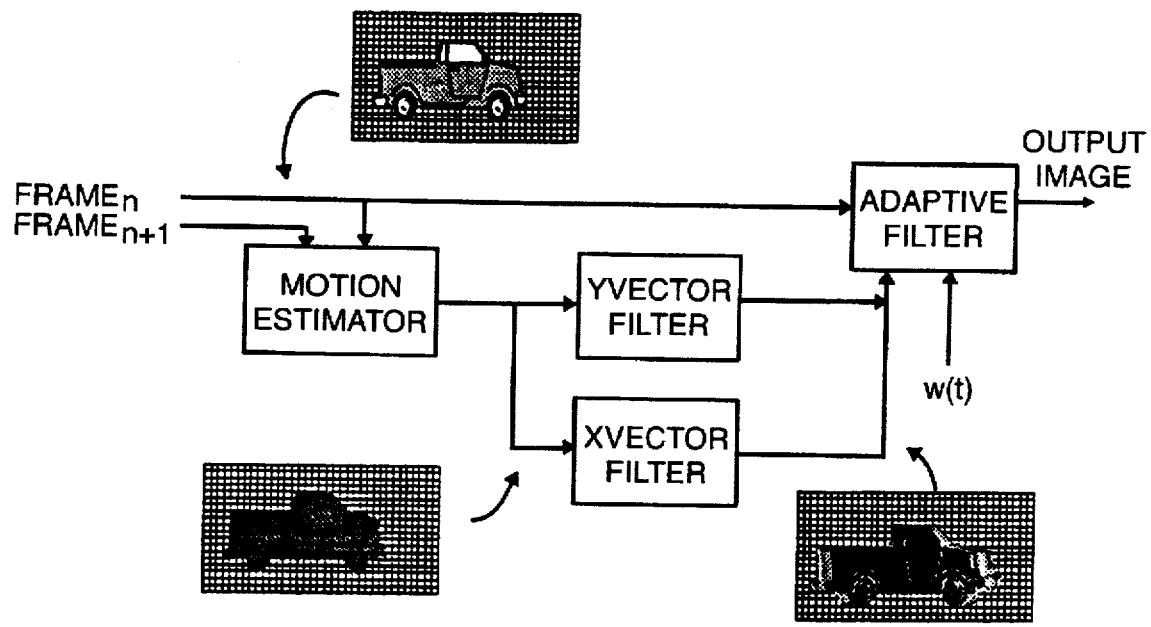
FIG. 5 illustrates schematically a second embodiment of the present invention.

The process may be carried out using an apparatus as illustrated in FIG. 5.

Input frames are fed to a motion estimator which produces a motion vector field as described above with reference to the first embodiment. The X component of the motion vector field is then low-pass filtered using a one-dimensional horizontal filter and, similarly, the Y component of the motion vector field is low-pass filtered using a one-dimensional vertical filter. A combined vector field is then produced from the output of the vertical and horizontal filters. This combined vector field is used to provide the data v for the adaptive filter. The adaptive filter operates according to the equation given above and processes the pixel values of frame n.

The bandwidths of the horizontal and vertical filters are adapted according to the magnitude of the vectors in the local vicinity of the pixels being filtered. The filter bandwidth may be set between no action and 1/vmax where vmax is the maximum vector in the local vicinity, eg. a patch of 64 by 64 pixels.

Although the invention has so far been described with reference to a purely animated image, in film special effects, it is often necessary to merge recorded live action with material which has been recorded by single frame animation models or other images. This is done by matting or keying the model or image sequences on top of the recorded live action. Such techniques are common in feature films for science fiction, adventure, etc where "monsters" for example may be used in the story.

In these merged images, the unnatural movement of the animated sequences is particularly noticeable. This is because the combined result highlights the differences in the movement characteristics of the recorded live action and the single frame animated sequences.

Finally, it may be noted from the techniques discussed above that if the full value of the motion vector (i.e. frame to frame (film) or field to field (video) motion) is used, the integration time will be equivalent to a 360° film camera shutter. Thus, as the value of the vector is scaled, then the effective shutter angle can be reduced to match that of the other action shots in the programme eg. 180° for drama or 60° for sport.

We claim:

1. A method for processing video frames comprising animated images so as to blur movement of the animated images between successive frames, the method comprising the steps of:

comparing a first input frame with the following input frame;

identifying moving areas in the first input frame by means of the comparison;

calculating the velocity of the movement of the moving areas between the first and following input frame;

summing, only for each input pixel site within the identified moving areas of the input frame, the pixel value of said each input pixel site and adjacent pixel values determined according to the calculated velocities and a predetermined aperture time for the input frame; and providing an output frame from at least the summed pixel values and pixel values of areas of the input frame other than said moving areas.

2. A method according to claim 1 further comprising the step of:

producing a vector field indicating the velocity of each pixel in the input frame.

3. A method according to claim 2 further comprising the step of low-pass filtering the vector field so as to further blur motion at transitions between moving areas and areas other than said moving areas.

4. A method according to claim 3 wherein the bandwidths used for low-pass filtering the vector field are adaptively determined and are determined according to the magnitude of velocities in the local vicinity of the pixel being filtered.

5. A method according to claim 4 comprising the step of using an FIR filter to process pixel values on the basis of the calculated velocities such that, for each pixel site of a moving area, the sum of adjacent pixels is output, whereas, for each pixel site where the velocity is zero, the respective pixel value of the input frame is output.

6. A method according to claim 5 wherein the FIR filter operates according to $$I_{blur}(x, y) = \left( \sum_{m=-\frac{vd}{2}}^{\frac{vd}{2}} w\left(\frac{m}{vd}\right) \times I_{sharp}(x+m, y) \right) / (vd)$$

where: (x,y)=pixel coordinates, Isharp=input pixel value, Iblur=output pixel value, v=velocity of object measured in number of pixels moved between the first input frame and the following input frame, d=predetermined aperture time as a fraction of the time between the first input frame and the following input frame, w=a shutter transmission characteristic.

7. A method according to claim 6 when the shutter transmission characteristic is non-linear through the predetermined aperture time.

8. A method according to claim 1 wherein the adjacent pixel values are predicted temporally adjacent pixel values for said each input pixel site for times intermediate said predetermined aperture time.

9. A method according to claim 8 further comprising the steps of:

predicting the pixel sites and the pixel values for moving areas of the image at each of said intermediate times; and providing, for each of said each input pixel site and any additional predicted sites, a weighted sum of the respective pixel values for the predetermined aperture time.

10. A method according to claim 9 further comprising the steps of:

storing, in an array having addresses corresponding to pixel sites, first flags indicating pixel sites of the moving areas in the input frame and second flags indicating all other pixel sites in the input frame; and for predicted pixel sites of the moving areas at the last intermediate time of the predetermined aperture time, replacing the first and second flags with third flags.

11. A method according to claim 10 further comprising, for pixel sites having second or third flags, the step of summing, for each pixel site, the respective pixel values of the input temporally and intermediate times.

12. A method according to claim 11 further comprising the steps of:

adding, for each of the respective pixel sites having second flags, the respective pixel value sum and an appropriate proportion of the respective pixel value for the following input frame; and adding, for each of the pixel sites having third flags, the respective pixel value sum and an appropriate proportion of the respective pixel value for the input frame.

13. A method according to claim 12 further comprising, prior to summing, the step of:

multiplying the pixel values of respective input and intermediate times by a weighting factor determined in accordance with a shutter transmission characteristic.

14. A method according to claim 13 wherein the shutter transmission characteristic is non-linear through the predetermined aperture time.

15. A method according to claim 13 further comprising the steps of:

recording, for each pixel site, a composite sum of the weighting factors applied to respective pixel values;

determining, for each pixel site, the fraction of the maximum possible composite sum recorded for that pixel site; and calculating said appropriate proportion by deducting said fraction from unity.

16. A method according to claim 15 wherein the shutter transmission characteristic is non-linear through the predetermined aperture time.

17. A method according to claim 1 wherein the adjacent pixel values are the pixel values of pixel sites in the input frame which are spatially adjacent in the direction of the velocity.

18. A method according to claim 17 wherein the step of summing comprises summing a number of pixel values, the number being generally proportional to a predicted number of pixel sites moved by the moving area during the predetermined aperture time.

19. An apparatus for processing video frames comprising animated images so as to blur movement of the animated images between successive frames, the apparatus comprising the steps of:

means for comparing a first input frame with the following input frame;

means for identifying moving areas in the first input frame by means of the comparison;

means for calculating the velocity of the movement of the moving areas between the first and following input frame;

means for summing, only for each input pixel site within the identified moving areas of the input frame, the pixel value of said each input pixel site and adjacent pixel values determined according to the calculated velocities and a predetermined aperture time for the input frame; and means for providing an output frame from at least the summed pixel values and pixel values of areas of the input frame other than said moving areas.

* * * * *